(12) United States Patent
Lee et al.

(10) Patent No.: US 10,594,910 B2
(45) Date of Patent: Mar. 17, 2020

(54) CAMERA MODULE CONFIGURED TO DETECT A POSITION OF A LENS BARREL BASED ON THE INDUCTANCES OF MULTIPLE SENSING COILS

(71) Applicant: Samsung Electro-Mechanics Co., Ltd., Suwon-si (KR)

(72) Inventors: Hong Joo Lee, Suwon-si (KR); Nam Ki Park, Suwon-si (KR); Young Bok Yoon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/158,849

(22) Filed: Oct. 12, 2018

(65) Prior Publication Data

US 2019/0273847 A1 Sep. 5, 2019

(30) Foreign Application Priority Data

Mar. 5, 2018 (KR) .................... 10-2018-0025834

(51) Int. Cl.
*H04N 5/228* (2006.01)
*H04N 5/225* (2006.01)
*G02B 7/10* (2006.01)
*H04N 5/232* (2006.01)
*G02B 27/64* (2006.01)
*G02B 7/08* (2006.01)

(52) U.S. Cl.
CPC ............ *H04N 5/2254* (2013.01); *G02B 7/08* (2013.01); *G02B 7/102* (2013.01); *G02B 27/646* (2013.01); *H04N 5/2252* (2013.01); *H04N 5/23212* (2013.01); *H04N 5/23267* (2013.01)

(58) Field of Classification Search
CPC combination set(s) only.
See application file for complete search history.

(56) References Cited

U.S. PATENT DOCUMENTS

2018/0299644 A1* 10/2018 Lee ...................... G03B 13/36

FOREIGN PATENT DOCUMENTS

| JP | 4064020 B2 | 3/2008 |
| JP | 2013-246051 A | 12/2013 |

(Continued)

OTHER PUBLICATIONS

Korean Office Action dated Oct. 16, 2019 in counterpart Korean Patent Application No. 10-2018-0025834 (9 pages in English and 7 pages in Korean).

*Primary Examiner* — Gary C Vieaux
(74) *Attorney, Agent, or Firm* — NSIP Law

(57) ABSTRACT

A camera module includes a first position sensor configured to detect a position of a lens barrel in a first direction and including a 1-1-th sensing coil and a 1-2-th sensing coil having respective inductances that change as the lens barrel moves in the first direction; and a second position sensor including a second sensing coil having an inductance that changes as the lens barrel moves in a second direction, and a third sensing coil having an inductance that changes as the lens barrel moves in a third direction, wherein the second position sensor is configured to detect a position of the lens barrel in the second direction and a position of the lens barrel in the third direction by adding or subtracting a reference inductance to or from the inductance of the second sensing coil and the inductance of the third sensing coil.

23 Claims, 7 Drawing Sheets

(56) References Cited

FOREIGN PATENT DOCUMENTS

| | | |
|---|---|---|
| JP | 2014-153325 A | 8/2014 |
| JP | 2015-225294 A | 12/2015 |
| KR | 10-1166418 B1 | 7/2012 |
| KR | 10-1609351 B1 | 4/2016 |
| KR | 10-2017-0126043 A | 11/2017 |

* cited by examiner

CAMERA MODULE CONFIGURED TO DETECT A POSITION OF A LENS BARREL BASED ON THE INDUCTANCES OF MULTIPLE SENSING COILS

CROSS-REFERENCE TO RELATED APPLICATIONS

This application claims the benefit under 35 USC 119(a) of Korean Patent Application No. 10-2018-0025834 filed on Mar. 5, 2018, in the Korean Intellectual Property Office, the entire disclosure of which is incorporated herein by reference for all purposes.

BACKGROUND

1. Field

This application relates to a camera module.

2. Description of Related Art

Recently, camera modules have been used in mobile communications terminals such as tablet personal computers (PC), laptop computers, and smartphones.

In addition, an autofocusing function and an optical image stabilization function have been provided in the camera module, and a component for determining a position of a lens has been added to such a camera module to perform a precision control.

In addition, recently, in accordance with the trend for miniaturization of the mobile communications terminals and the camera modules, the sizes of actuators for autofocusing and optical image stabilization in the camera modules have been reduced.

However, as the size of the actuators has been reduced, a magnitude of a driving force needed for driving the lens has been reduced, and a sensitivity of a sensor for determining a position of the lens has been reduced, making it difficult to perform precise driving.

That is, it is difficult to both miniaturize a camera module and improve its performance.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a first position sensor configured to detect a position of a lens barrel in a first direction and including a 1-1-th sensing coil and a 1-2-th sensing coil having respective inductances that change as the lens barrel moves in the first direction; and a second position sensor including a second sensing coil having an inductance that changes as the lens barrel moves in a second direction, and a third sensing coil having an inductance that changes as the lens barrel moves in a third direction, wherein the second position sensor is configured to detect a position of the lens barrel in the second direction and a position of the lens barrel in the third direction by adding or subtracting a reference inductance to or from the inductance of the second sensing coil and the inductance of the third sensing coil, and the reference inductance is obtained by multiplying a sum value obtained by adding together the inductance of the 1-1-th sensing coil and the inductance of the 1-2-th sensing coil by a predetermined constant.

The 1-1-th sensing coil and the 1-2-th sensing coil may be configured so that increase and decrease directions of the inductance of the 1-1-th sensing coil as the lens barrel moves in the first direction are different from increase and decrease directions of the inductance of the 1-2-th sensing coil as the lens barrel moves in the first direction.

The 1-1-th sensing coil and the 1-2-th sensing coil may be arranged in the first direction, and the first direction may be an optical-axis direction of an optical axis of the lens barrel.

The first position sensor may be further configured to detect the position of the lens barrel in the first direction by subtracting the inductance of the 1-2-th sensing coil from the inductance of the 1-1-th sensing coil.

The first position sensor may further include a sensing yoke configured to move in the first direction together with the lens barrel, and the sensing yoke may be disposed to face the 1-1-th sensing coil and the 1-2-th sensing coil in a direction perpendicular to the first direction.

The sensing yoke may be a conductor or a magnetic body.

The camera module may further include a focusing actuator configured to move the lens barrel in the first direction and including a first magnet configured to move in the first direction together with the lens barrel, and a first coil disposed to face the first magnet.

The camera module further include a shake correction actuator including a second magnet disposed to face the second sensing coil in the second direction and configured to move in the second direction together with the lens barrel, and a third magnet disposed to face the third sensing coil in the third direction and configured to move in the third direction together with the lens barrel.

The second sensing coil may be configured to generate a driving force in the second direction by interacting with the second magnet, and so that the inductance of the second sensing coil changes depending on movement of the second magnet.

The second sensing coil may be further configured to generate the driving force in the second direction in response to direct current (DC) power and alternating current (AC) power being applied together to the second sensing coil.

The third sensing coil may be configured to generate a driving force in the third direction by interacting with the third magnet, and so that the inductance of the third coil changes depending on movement of the third magnet.

The third sensing coil may be further configured to generate the driving force in the third direction in response to direct current (DC) power and alternating current (AC) power being applied together to the third sensing coil.

The first direction may be an optical-axis direction of an optical axis of the lens barrel, the second direction may be a direction perpendicular to the first direction, and the third direction may be a direction perpendicular to both the first direction and the second direction.

In another general aspect, a camera module includes a lens barrel; a housing accommodating the lens barrel therein; a focusing actuator configured to move the lens barrel in a first direction and including a first magnet configured to move in the first direction together with the lens barrel, and a first coil disposed to face the first magnet; a shake correction actuator configured to move the lens barrel in a second direction perpendicular to the first direction and a third direction perpendicular to both the first direction and the second direction, the shake correction actuator including a second magnet configured to move in the second direction together with the lens barrel, a third magnet configured to move in the third direction together with the lens barrel, a second coil disposed to face the second magnet, and a third coil disposed to face the third magnet; a first position sensor configured to detect a position of the lens barrel in the first direction; and a second position sensor configured to detect a position of the lens barrel in the second direction and a position of the lens barrel in the third direction, wherein the first position sensor includes a 1-1-th sensing coil configured so that an inductance thereof changes as the lens barrel moves in the first direction, and a 1-2-th sensing coil configured so that an inductance thereof changes as the lens barrel moves in the first direction, the second position sensor is further configured to detect the position of the lens barrel in the second direction by adding or subtracting a reference inductance to or from an inductance of the second coil, and detect the position of the lens barrel in the third direction by adding or subtracting the reference inductance to or from an inductance of the third coil, and the reference inductance is obtained by multiplying a sum value obtained by adding together the inductance of the 1-1-th sensing coil and the inductance of the 1-2-th sensing coil by a predetermined constant.

The 1-1-th sensing coil and the 1-2-th sensing coil may be arranged in the first direction, the first direction may be an optical-axis direction of an optical axis of the lens barrel, and the 1-1-th sensing coil and the 1-2-th sensing coil may be configured so that increase and decrease directions of the inductance of the 1-1-th sensing coil as the lens barrel moves in the first direction are different from increase and decrease directions of the inductance of the 1-2-th sensing coil as the lens barrel moves in the first direction.

In another general aspect, a camera module includes a 1-1-th sensing coil having an inductance that changes as a lens barrel moves in a first direction; a 1-2-th sensing coil having an inductance that changes as the lens barrel moves in the first direction; a second sensing coil having an inductance that changes as the lens barrel moves in a second direction; a third sensing coil having an inductance that changes as the lens barrel moves in a third direction; and a processor configured to detect a position of the lens barrel in the first direction based on the inductance of the 1-1-th sensing coil and the inductance of the 1-2-th sensing coil, detect a position of the lens barrel in the second direction based on the inductance of the second sensing coil, the inductance of the 1-1-th sensing coil, and the inductance of the 1-2-th sensing coil, and detect a position of the lens barrel in the third direction based on the inductance of the third sensing coil, the inductance of the 1-1-th sensing coil, and the inductance of the 1-2-th sensing coil.

The camera module may further include a memory configured to store instructions executable by the processor, and the processor may be further configured to execute the instructions to configure the processor to detect the position of the lens barrel in the first direction based on the inductance of the 1-1-th sensing coil and the inductance of the 1-2-th sensing coil, detect the position of the lens barrel in the second direction based on the inductance of the second sensing coil, the inductance of the 1-1-th sensing coil, and the inductance of the 1-2-th sensing coil, and detect the position of the lens barrel in the third direction based on the inductance of the third sensing coil, the inductance of the 1-1-th sensing coil, and the inductance of the 1-2-th sensing coil.

The processor may be further configured to obtain a difference value by subtracting the inductance of the 1-2-th sensing coil from the inductance of the 1-1-th sensing coil, obtain a sum value by adding together the inductance of the 1-1-th sensing coil and the inductance of the 1-2-the sensing coil, detect the position of the lens barrel in the first direction based on the difference value, detect the position of the lens barrel in the second direction based on the inductance of the second sensing coil and the sum value, and detect the position of the lens barrel in the third direction based on the inductance of the third sensing coil and the sum value.

The 1-1-th sensing coil and the 1-2-th sensing coil may be configured so that a direction in which the inductance of the 1-1-th sensing coil changes as the lens barrel moves in the first direction is opposite to a direction in which the inductance of the 1-2-th sensing coil changes as the lens barrel moves in the first direction.

In another general aspect, a camera module includes a first sensing coil including a 1-1-th sensing coil and a 1-2-th sensing coil configured so that a first value based on an inductance of the 1-1-th sensing coil and an inductance of the 1-2-th sensing coil changes as a lens barrel moves in a first direction, and a second value based on the inductance of the 1-1-th sensing coil and the inductance of the 1-2-th sensing coil remains constant as the lens barrel moves in the first direction; a second sensing coil having an inductance that changes as the lens barrel moves in a second direction; a third sensing coil having an inductance that changes as the lens barrel moves in a third direction; and a processor configured to detect a position of the lens barrel in the first direction based on the first value; detect a position of the lens barrel in the second direction based on the inductance of the second sensing coil and the second value, and detect a position of the lens barrel in the third direction based on the inductance of the third sensing coil and the second value.

The camera module may further include a memory configured to store instructions executable by the processor, and the processor may be further configured to execute the instructions to configure the processor to detect the position of the lens barrel in the first direction based on the first value; detect the position of the lens barrel in the second direction based on the inductance of the second sensing coil and the second value, and detect the position of the lens barrel in the third direction based on the inductance of the third sensing coil and the second value.

The processor may be further configured to obtain the first value by subtracting the inductance of the 1-2-th sensing coil from the inductance of the 1-1-th sensing coil, obtain the second value by adding together the inductance of the 1-1-th sensing coil and the inductance of the 1-2-th sensing coil, obtain a reference inductance by multiplying the second value by a predetermined constant, obtain a first compensated inductance by adding or subtracting the reference inductance to or from the inductance of the second sensing coil, obtain a second compensated inductance by adding or subtracting the reference to or from the inductance of the third sensing coil, detect the position of the lens barrel in the second direction based on the first compensated inductance, and detect the position of the lens barrel in the third direction based on the second compensated inductance.

The 1-1-th sensing coil and the 1-2-th sensing coil may be further configured so that the inductance of the 1-1-th sensing coil and the inductance of the 1-2-th sensing coil change in opposite directions as the lens barrel moves in the first direction, and change in a same direction as a temperature of the camera module changes.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
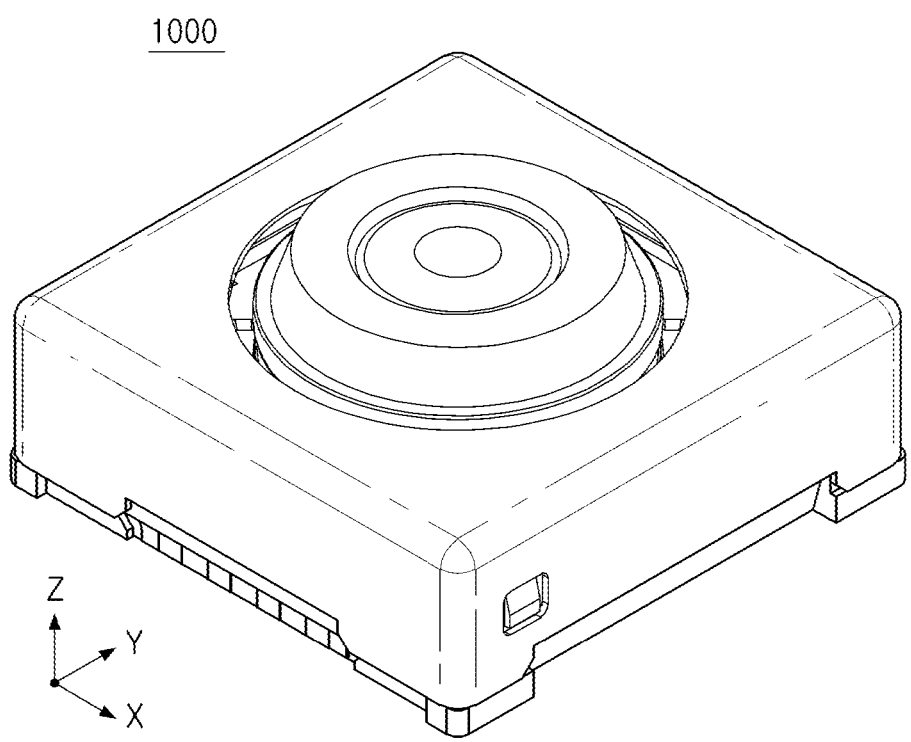
FIG. 1 is a perspective view illustrating an example of a camera module.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

This application relates to a camera module that may be used in a portable electronic device such as a mobile communications terminal, a smartphone, or a tablet personal computer (PC).

Figure 2:
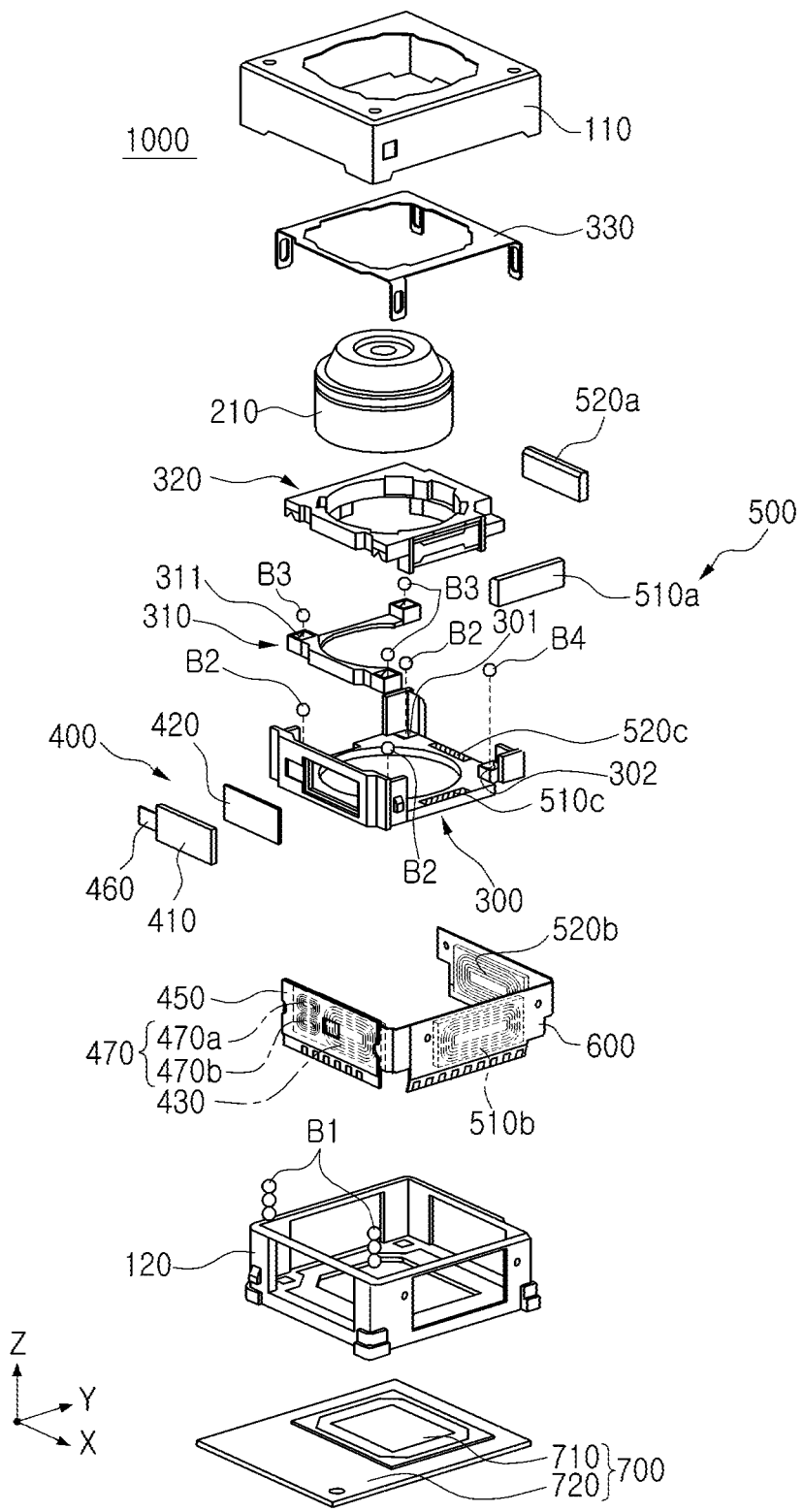
FIG. 2 is a schematic exploded perspective view illustrating the camera module of FIG. 1.

FIG. 1 is a perspective view illustrating an example of a camera module, and FIG. 2 is a schematic exploded perspective view illustrating the camera module of FIG. 1.

Figure 3A:
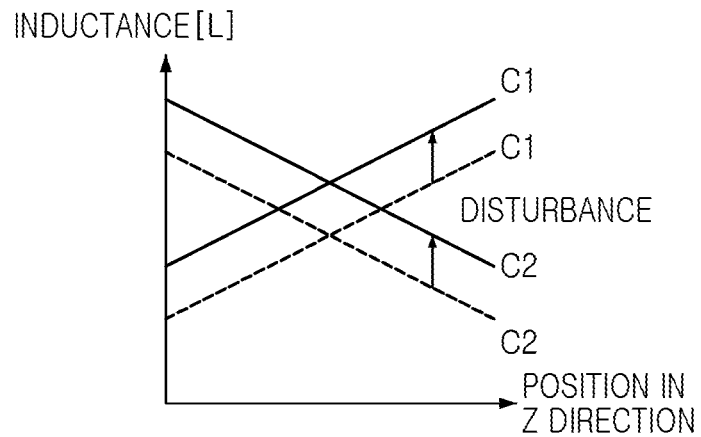
FIGS. 3A through 3C are views illustrating an example of a change in inductance of a first sensing coil of the camera module of FIG. 1.
Figure 3B:
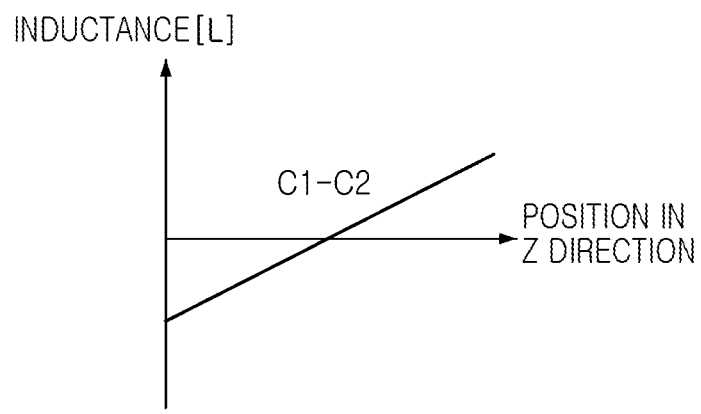
Figure 3C:
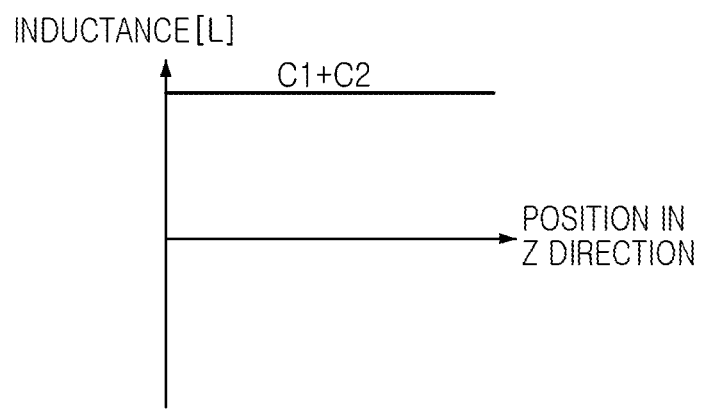

FIGS. 3A through 3C are views illustrating an example of a change in inductance of a first sensing coil of the camera module of FIG. 1.

Referring to FIGS. 1 and 2, a camera module 1000 includes a lens barrel 210, a lens actuator for moving the lens barrel 210, an image sensor module 700 for converting light incident thereto through the lens barrel 210 into an electrical signal, and a housing 120 and a case 110 accommodating the lens barrel 210 and the lens actuator therein.

The lens barrel 210 has a hollow cylindrical shape to accommodate a plurality of lenses capturing an image of a subject, and the plurality of lenses are mounted in the lens barrel 210 along an optical axis.

The number of lenses disposed in the lens barrel 210 depends on a design of the lens barrel 210, and the respective lenses may have optical characteristics such as the same refractive index or different refractive indices, for example.

In this example, the lens actuator moves the lens barrel 210 in a first direction to focus the lenses, and moves the lens barrel 210 in a second direction perpendicular to the first direction and a third direction perpendicular to both the first direction and the second direction to correct shake when capturing an image.

The first direction is an optical-axis direction (a Z-axis direction), the second direction is a direction (an X-axis direction) perpendicular to the first direction, and the third direction is a direction (a Y-axis direction) perpendicular to both the first direction and the second direction.

The lens actuator includes a focusing actuator 400 for focusing the lenses and a shake correction actuator 500 for correcting the shake.

The image sensor module 700 is a device for converting light incident thereto through the lens barrel 210 into an electrical signal.

In this example, the image sensor module 700 includes an image sensor 710 and a printed circuit board 720 connected to the image sensor 710, and further includes an infrared filter (not illustrated in FIG. 2).

The infrared filter cuts off light in an infrared region in the light incident thereto through the lens barrel 210.

The image sensor 710 converts the light incident thereto through the lens barrel 210 into the electrical signal. For example, the image sensor 710 may be a charge-coupled device (CCD) or a complementary metal-oxide-semiconductor device (CMOS).

The electrical signal converted by the image sensor 710 may be output as an image through a display of a portable electronic device.

The image sensor 710 is mounted on the printed circuit board 720, and may be electrically connected to the printed circuit board 720 by wire bonding.

The lens barrel 210 and the lens actuator are accommodated in the housing 120.

In this example, the housing 120 has an open top and an open bottom, and the lens module 210 and the lens actuator are accommodated in an internal space of the housing 120.

The image sensor module 700 is disposed on the bottom of the housing 120.

In addition, a substrate 600 for providing a driving signal to the focusing actuator 400 and the shake correction actuator 500 is disposed on side surfaces of the housing 120. In this example, the substrate 600 is provided as one substrate 600 surrounding three side surfaces of the housing 120.

The housing 120 has openings in the side surfaces thereof to accommodate a first coil 430 and a first sensing coil 470 of a first position sensor 440 of the focusing actuator 400, and a second coil 510b and a third coil 520b of the shake correction actuator 500, as described below.

The case 110 is coupled to the housing 120, and serves to protect internal components of the camera module 1000.

In addition, the case 110 serves to shield electromagnetic waves.

For example, the case 110 shields electromagnetic waves generated by the camera module so that the electromagnetic waves do not influence other electronic components in the portable electronic device.

In addition, since several electronic components as well as the camera module are mounted in the portable electronic device, the case 110 shields electromagnetic waves generated by these electronic components so that the electromagnetic waves do not influence the camera module.

The case 110 is made of metal and is grounded to a ground pad provided on the printed circuit board 720 to shield the electromagnetic waves.

The focusing actuator 400 of the lens actuator of the camera module 1000 will be described with reference to FIGS. 2 through 3C.

The lens barrel 210 is moved by the lens actuator to focus the lenses on a subject.

In this example, the lens actuator includes the focusing actuator 400 for moving the lens barrel 210 in the first direction (the Z-axis direction).

The focusing actuator 400 includes a carrier 300 accommodating the lens barrel 210 therein, and a first magnet 410 and the first coil 430 for generating a driving force to move the lens barrel 210 and the carrier 300 in the first direction (the Z-axis direction).

The first magnet 410 is mounted on the carrier 300. As an example, the first magnet 410 is mounted on a surface of the carrier 300.

The first coil 430 may be copper foil patterns stacked and embedded in the substrate 600. The substrate 600 is mounted on the side surfaces of the housing 120 so that the first magnet 410 and the first coil 430 face each other in a direction perpendicular to the optical axis (a Z axis).

The first magnet 410 is a moving member mounted on the carrier 300 to move in the first direction (the Z-axis direction) together with the carrier 300, and the first coil 430 is a fixed member fixed to the housing 120.

When power is applied to the first coil 430, the carrier 300 is moved in the first direction (the Z-axis direction) by an electromagnetic interaction between the first magnet 410 and the first coil 430.

As illustrated in FIG. 2, since a frame 310 and a lens holder 320 are accommodated in the carrier 300 and the lens barrel 210 is mounted in the lens holder 320, the frame 310, the lens holder 320, and the lens barrel 210 are also moved in the first direction (the Z-axis direction) by movement of the carrier 300.

Rolling members B1 are disposed between the carrier 300 and the housing 120 to reduce friction between the carrier 300 and the housing 120 when the carrier 300 is moved. The rolling members B1 may have a ball form.

The rolling members B1 are disposed at opposite ends of the first magnet 410.

A first yoke 450 is disposed facing the first magnet 410 in the direction perpendicular to the optical axis (the Z axis). In this example, the first yoke 450 is mounted on an outer surface of the substrate 600 (that is, a surface of the substrate 600 opposing a surface of the substrate 600 in which the first coil 430 is embedded). Therefore, the first yoke 450 is disposed facing the first magnet 410 with the first coil 430 interposed therebetween.

An attractive force acts in the direction perpendicular to the optical axis (the Z axis) between the first yoke 450 and the first magnet 410.

Therefore, the rolling members B1 are maintained in a state in which they are held in contact with the carrier 300 and the housing 120 by the attractive force between the first yoke 450 and the first magnet 410.

In addition, the first yoke 450 serves to focus a magnetic force of the first magnet 410. Therefore, generation of a leakage magnetic flux may be prevented.

The first yoke 450 and the first magnet 410 form a magnetic circuit.

A second yoke 420 is disposed between the first magnet 410 and the carrier 300. The second yoke 420 serves to focus a magnetic force of the first magnet 410. Therefore, generation of a leakage magnetic flux may be prevented.

The second yoke 420 and the first magnet 410 form a magnetic circuit.

In the examples described in this application, a closed loop control method of detecting and feeding back a position of the lens barrel 210 is used.

Therefore, the first position sensor 440 is provided to perform a closed loop control. The first position sensor 440 includes the first sensing coil 470 and a controller 800 (see FIG. 5). The controller 800 receives an inductance value from the first sensing coil 470 to detect a position of the lens barrel 210 in the first direction (the Z-axis direction).

The first sensing coil 470 may be copper foil patterns stacked and embedded in the substrate 600, similar to the first coil 430.

The first sensing coil 470 is disposed to face a sensing yoke 460 disposed adjacent to the first magnet 410. The sensing yoke 460 is mounted on a surface of the carrier 300, and may be a conductor or a magnetic body.

The first sensing coil 470 is disposed to face the sensing yoke 460 in a direction (the Y-axis direction) perpendicular to the optical axis (the Z axis). In addition, the first sensing coil 470 is disposed adjacent to the first coil 430.

As the carrier 300 is moved in the first direction (the Z-axis direction), the sensing yoke 460 mounted on the carrier 300 is also moved in the first direction (the Z-axis direction). Therefore, an inductance of the first sensing coil 470 changes. The controller 800 receives the inductance value from the first sensing coil 470 to detect a position of the lens barrel 210 (a position of the lens barrel 210 in the first direction (the Z-axis direction)).

Therefore, a position of the sensing yoke 460 may be detected based on the change in the inductance of the first sensing coil 470. Since the sensing yoke 460 is mounted on the carrier 300, the lens barrel 210 is accommodated in the carrier 300, and the carrier 300 is moved in the first direction (the Z-axis direction) together with the lens barrel 210, the position of the lens barrel 210 (the position of the lens barrel 210 in the first direction (the Z-axis direction)) may be ultimately detected based on the change in the inductance of the first sensing coil 470.

The first sensing coil 470 includes a plurality of coils arranged in the first direction (the Z-axis direction). For example, the first sensing coil 470 includes two coils arranged in the first direction (the Z-axis direction). One of the two coils is referred to as a 1-1-th sensing coil 470a, and the other of the two coils is referred to as a 1-2-th sensing coil 470b.

As illustrated in FIG. 3A, inductances C1 and C2 of the 1-1-th sensing coil 470a and the 1-2-th sensing coil 470b also change due to factors other than relative positions between the 1-1-th and 1-2-th sensing coils 470a and 470b and the sensing yoke 460.

As an example, the inductances C1 and C2 of the 1-1-th sensing coil 470a and the 1-2-th sensing coil 470b also change due to an influence of a disturbance caused by a temperature change of the surrounding environment. Therefore, an error occurs in the detected position of the lens barrel 210 due to the disturbance.

Although FIG. 3A illustrates a case in which the inductances C1 and C2 increase due to the disturbance, the inductances C1 and C2 may also decrease due to the disturbance.

In this example, as illustrated in FIG. 3A, the 1-1-th sensing coil 470a and the 1-2-th sensing coil 470b are configured so that when the lens barrel 210 is moved in the first direction (the Z-axis direction), increase and decrease directions of the inductances C1 and C2 of the 1-1-th sensing coil 470a and the 1-2-th sensing coil 470b are different from each other.

In this example, both the change in the inductance C1 of the 1-1-th sensing coil 470a and the change in the inductance C2 of the 1-2-th sensing coil 470b are used to remove an influence of the disturbance and detect an accurate position of the lens barrel 210.

For example, the first position sensor 440 is configured to precisely detect the position of the lens barrel 210 in the first direction (the Z-axis direction) by subtracting a value of the inductance C2 of the 1-2-th sensing coil 470b from a value of the inductance C1 of the 1-1-th sensing coil 470a (see FIG. 3B).

A difference value (C1−C2) obtained by subtracting the value of the inductance C2 of the 1-2-th sensing coil 470b from the value of the inductance C1 of the 1-1-th sensing coil 470a increases or decreases depending on the position of the lens barrel 210 regardless of the disturbance.

That is, when the sensing yoke 460 is moved in the first direction (the Z-axis direction), the position of the lens barrel 210 in the first direction (the Z-axis direction) is more accurately detected based on a difference between signals generated by the 1-1-th sensing coil 470a and the 1-2-th sensing coil 470b.

Referring to FIG. 3C, since the 1-1-th sensing coil 470a and the 1-2-th sensing coil 470b are configured so that the increase and decrease directions of the inductances C1 and C2 thereof are different from each other, when the value of the inductance C1 of the 1-1-th sensing coil 470a and the value of the inductance C2 of the 1-2-th sensing coil 470b are added together to obtain a sum value (C1+C2), the sum value (C1+C2) of the inductances has a constant value regardless of the position of the lens barrel 210. That is, the sum value (C1+C2) of the inductances is changed by the disturbance, but is not changed by a change in the position of the lens barrel 210.

In this example, the influence of the disturbance at the time of correcting shake is removed using the sum value (C1+C2) of the inductances. This will be described below with reference to FIGS. 4 through 9.

The first position sensor 440 further includes at least one capacitor (not illustrated in FIG. 5), and the at least one capacitor and the first sensing coil 470 form an oscillation circuit. As an example, the number of capacitors included in the first position sensor 440 correspond to the number of coils included in the first sensing coil 470, and one capacitor and one coil 470a or 470b form an LC oscillator.

The first position sensor 440 detects a displacement of the lens barrel 210 from a change in a frequency of an oscillation signal generated by the oscillation circuit. In detail, when the inductance of the first sensing coil 470 forming the oscillation circuit changes, the frequency of the oscillation signal generated by the oscillation circuit changes, and the displacement of the lens barrel 210 may thus be detected based on the change in the frequency.

Although in this example the first sensing coil 470 is disposed to face the sensing yoke 460, in another example the sensing yoke 460 may be omitted and the first sensing coil 470 may instead be disposed to face the first magnet 410.

Figure 4:
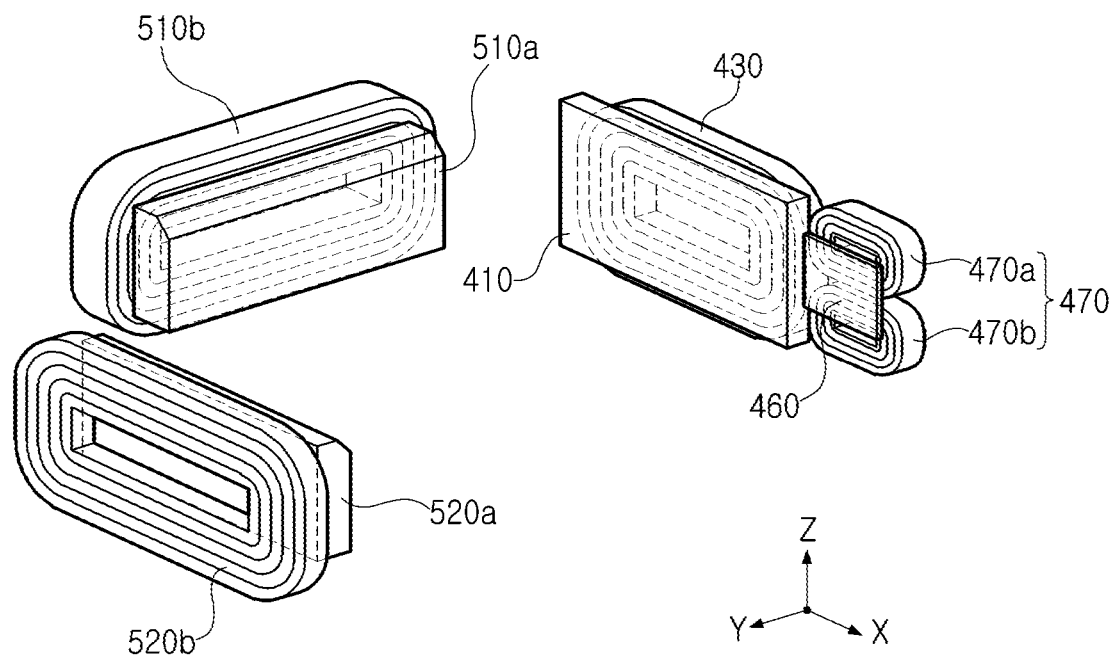
FIG. 4 is a schematic view illustrating an example of an arrangement of a plurality of magnets and a plurality of coils of a focusing actuator and a shake correction actuator.
Figure 5:
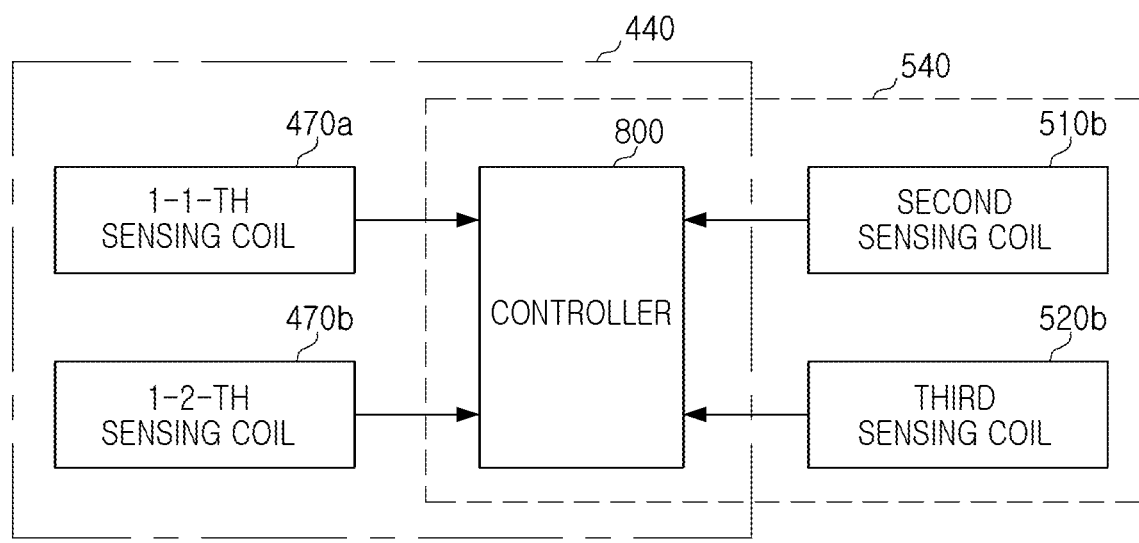
FIG. 5 is a schematic block diagram illustrating an example of a first position sensor and a second position sensor.

FIG. 4 is a schematic view illustrating an example of an arrangement of a plurality of magnets and a plurality of coils of a focusing actuator and a shake correction actuator, and FIG. 5 is a schematic block diagram illustrating an example of a first position sensor and a second position sensor.

Figure 6:
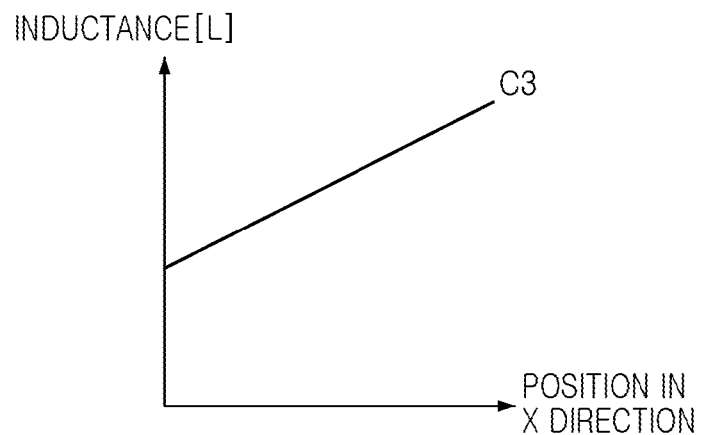
FIG. 6 is a view illustrating an example of a change in inductance of a second coil.
Figure 7:
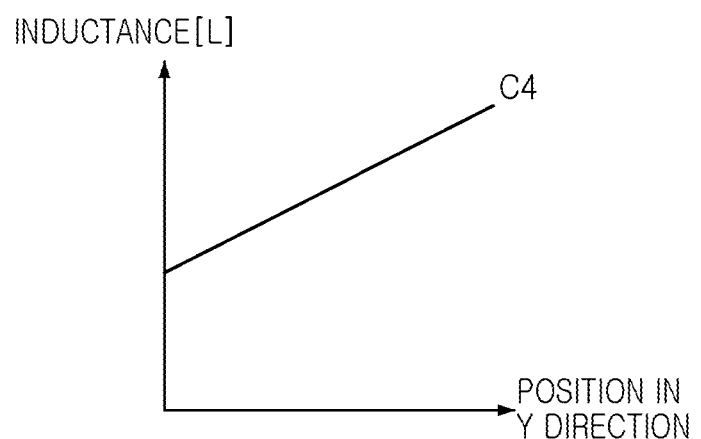
FIG. 7 is a view illustrating an example of a change in inductance of a third coil.

FIG. 6 is a view illustrating an example of a change in inductance of a second coil, and FIG. 7 is a view illustrating an example of a change in inductance of a third coil.

The shake correction actuator 500 of the lens actuator of the camera module 1000 will be now described.

The shake correction actuator 500 is used to correct image blurring or moving picture shaking due to a factor such as handshake of a user when capturing an image or a moving picture.

For example, when the shake is generated at the time of capturing the image due to the handshake of the user or other disturbance, the shake correction actuator 500 compensates for the shake by displacing the lens barrel 210 to be relatively displaced to correspond to the shake.

As an example, the shake correction actuator 500 moves the lens barrel 210 in the direction perpendicular to the optical axis (the Z axis) to correct the shake.

Referring to FIG. 2, the shake correction actuator 500 includes a guide member guiding the movement of the lens barrel 210 and a plurality of magnets and a plurality of coils generating a driving force to move the guide member in the direction perpendicular to the optical axis (the Z axis).

The plurality of magnets include a second magnet 510a and a third magnet 520a, and the plurality of coils include the second coil 510b and the third coil 520b.

The guide member includes the frame 310 and the lens holder 320. The frame 310 and the lens holder 320 are inserted into the carrier 300, are disposed in the first direction (the Z-axis direction), and serve to guide the movement of the lens barrel 210.

The frame 310 and the lens holder 320 have a space into which the lens barrel 210 may be inserted. The lens barrel 210 is inserted and fixed into the lens holder 320.

The frame 310 and the lens holder 320 are moved in the direction perpendicular to the optical axis (the Z-axis) with respect to the carrier 300 by the driving force generated by the plurality of magnets and the plurality of coils.

The second magnet 510a and the second coil 510b generate a driving force in the second direction (the X-axis direction) perpendicular to the optical axis (the Z axis), and the third magnet 520a and the third coil 520b generate a driving force in the third direction (the Y-axis direction) perpendicular to the optical axis (the Z axis). That is, the plurality of magnets and the plurality of coils generate the driving forces in the directions in which they face each other.

The third direction (the Y-axis direction) is a direction perpendicular to both the first direction (the Z-axis direction) and the second direction (the X-axis direction).

The plurality of magnets are disposed to be orthogonal to each other on a plane perpendicular to the optical axis (the Z axis), and the plurality of coils are also be disposed to be orthogonal to each other on the plane perpendicular to the optical axis (the Z axis).

The second magnet 510a and the third magnet 520a are mounted on the lens holder 320. As an example, the second magnet 510a and the third magnet 520a are mounted on respective side surfaces of the lens holder 320. The side surfaces of the lens holder 320 include a first surface and a second surface perpendicular to each other, and the second magnet 510a and the third magnet 520a are respectively disposed on the first surface and the second surface of the lens holder 320.

The second coil 510b and the third coil 520b are copper foil patterns stacked and embedded in the substrate 600. The substrate 600 is mounted on the side surfaces of the housing 120 so that second magnet 510a and the second coil 510b face each other in the second direction (the X-axis direction), and the third magnet 520a and the third coil 520b face each other in the third direction (the Y-axis direction).

The second magnet 510a and the third magnet 520a are moving members moving in the directions perpendicular to the optical axis (the Z axis) together with the lens holder 320, and the second coil 510b and the third coil 520b are fixed members fixed to the housing 120.

In this example, a plurality of ball members supporting the frame 310 and the lens holder 320 of the shake correction actuator 500 are provided. The plurality of ball members serve to guide movement of the frame 310, the lens holder 320, and the lens barrel 210 in a shake correcting process. In addition, the plurality of ball members also serve to maintain spacings between the carrier 300, the frame 310, and the lens holder 320.

The plurality of ball members include first ball members B2 and second ball members B3.

The first ball members B2 guide movement of the frame 310, the lens holder 320, and the lens barrel 210 in the second direction (the X-axis direction), and the second ball members B3 guide movement of the lens holder 320 and the lens barrel 210 in the third direction (the Y-axis direction).

As an example, the first ball members B2 are moved in a rolling motion in the second direction (the X-axis direction) when the driving force in the second direction (the X-axis direction) is generated. Therefore, the first ball members B2 guide the movement of the frame 310, the lens holder 320, and the lens barrel 210 in the second direction (the X-axis direction).

In addition, the second ball members B3 are moved in a rolling motion in the third direction (the Y-axis direction) when the driving force in the third direction (the Y-axis direction) is generated. Therefore, the second ball members B3 guide the movement of the lens holder 320 and the lens barrel 210 in the third direction (the Y-axis direction).

The first ball members B2 include a plurality of ball members arranged between the carrier 300 and the frame 310, and the second ball members B3 include a plurality of ball members arranged between the frame 310 and the lens holder 320.

First guide groove portions 301 accommodating the first ball members B2 therein are formed in surfaces of the carrier 300 and the frame 310 facing each other in the first direction (the Z-axis direction). The first guide groove portions 301 include a plurality of guide grooves respectively corresponding to the plurality of ball members of the first ball members B2.

The first ball members B2 are accommodated in the first guide groove portions 301 and are fitted between the carrier 300 and the frame 310.

Movement of the first ball members B2 is restricted in the first direction (the Z-axis direction) and the third direction (the Y-axis direction), and the first ball members B2 may be moved in only the second direction (the X-axis direction), in a state in which the first ball members B2 are accommodated in the first guide groove portions 301. As an example, the first ball members B2 may be moved in a rolling motion in only the second direction (the X-axis direction).

To enable this, a planar shape of each of the plurality of guide grooves of the first guide groove portion 301 is a rectangular shape having a length in the second direction (the X-axis direction). The term "planar shape" refers to a shape of a guide groove in a plane perpendicular to the Z axis and intersecting the guide groove.

Second guide groove portions 311 accommodating the second ball members B3 therein are formed in surfaces of the frame 310 and the lens holder 320 facing each other in the first direction (the Z-axis direction). The second guide groove portions 311 include a plurality of guide grooves respectively corresponding to the plurality of ball members of the second ball members B3.

The second ball members B3 are accommodated in the second guide groove portions 311 and are fitted between the frame 310 and the lens holder 320.

Movement of the second ball members B3 is restricted in the first direction (the Z-axis direction) and the second direction (the X-axis direction), and the second ball members B3 may be moved in only the third direction (the Y-axis direction), in a state in which the second ball members B3 are accommodated in the second guide groove portions 311. As an example, the second ball members B3 may be moved in a rolling motion in only the third direction (the Y-axis direction).

To enable this, a planar shape of each of the plurality of guide grooves of the second guide groove portion 311 is a rectangular shape having a length in the third direction (the Y-axis direction).

In addition, a third ball member B4 disposed between the carrier 300 and the lens holder 320 and supporting movement of the lens holder 320 is provided.

The third ball member B4 guides both movement of the lens holder 320 in the second direction (the X-axis direction) and movement of the lens holder 320 in the third direction (the Y-axis direction).

As an example, the third ball member B4 is moved in a rolling motion in the second direction (the X-axis direction) when the driving force in the second direction (the X-axis direction) is generated. Therefore, the third ball member B4 guides the movement of the lens holder 320 in the second direction (the X-axis direction).

In addition, the third ball member B4 is moved in a rolling motion in the third direction (the Y-axis direction) when the driving force in the third direction (the Y-axis direction) is generated. Therefore, the third ball member B4 guides the movement of the lens holder 320 in the third direction (the Y-axis direction).

Thus, the second ball members B3 and the third ball member B4 are in contact with and support the lens holder 320.

A third guide groove portion 302 accommodating the third ball member B4 therein is formed in surfaces of the carrier 300 and the lens holder 320 facing each other in the first direction (the Z-axis direction).

The third ball member B4 is accommodated in the third guide groove portion 302 and is fitted between the carrier 300 and the lens holder 320.

Movement of the third ball member B4 is restricted in the first direction (the Z-axis direction), and the third ball member B4 may be moved in a rolling motion in the second direction (the X-axis direction) and the third direction (the Y-axis direction), in a state in which the third ball member B4 is accommodated in the third guide groove portion 302.

To enable this, a planar shape of the third guide groove portion 302 is a circular shape. Therefore, the planar shape of the third guide groove portion 302 is different from the planar shape of the first guide groove portions 301 and the planar shape of the second guide groove portions 311.

The first ball members B2 are movable in the rolling motion in only the second direction (the X-axis direction), the second ball members B3 are movable in the rolling motion in only the third direction (the Y-axis direction), and the third ball member B4 is movable in the rolling motion in the second direction (the X-axis direction) and the third direction (the Y-axis direction).

Therefore, the plurality of ball members supporting the shake correction actuator 500 have different degrees of freedom.

The term "degree of freedom" refers to the number of independent variables needed to represent a motion state of an object in a three-dimensional (3D) coordinate system.

Generally, in the 3D coordinate system, a degree of freedom of an object is 6. Movement of the object may be represented by an orthogonal coordinate system having three directions and a rotary coordinate system having three directions.

As an example, in the 3D coordinate system, the object may be moved in a translation motion along three axes (the X axis, the Y axis, and the Z axis), and may be moved in a rotation motion around the respective axes (the X axis, the Y axis, and the Z axis).

In the examples described in this application, the term "degree of freedom" refers to the number of independent variables needed to represent movement of the first ball members B2, the second ball members B3, and the third ball member B4 when the shake correction actuator 500 is moved by the driving force generated in the direction perpendicular to the optical axis (the Z axis) by applying power to the shake correction actuator 500.

As an example, the third ball member B4 may be moved in the rolling motion along two axes (the first axis (the X axis) and the second axis (the Y axis)), and the first ball members B2 and the second ball members B3 may be moved in the rolling motion along one axis (the first axis (the X axis) or the second axis (the Y axis)), by the driving force generated in the direction perpendicular to the optical axis (the Z axis).

Therefore, a degree of freedom of the third ball member B4 is greater than a degree of freedom of the first ball members B2 and a degree of freedom of the second ball members B3.

When the driving force in the second direction (the X-axis direction) is generated, the frame 310, the lens holder 320, and the lens barrel 210 are moved together in the second direction (the X-axis direction).

In this case, the first ball members B2 and the third ball member B4 are moved in the rolling motion in the second direction (the X-axis direction), and the movement of the second ball members B3 is restricted.

In addition, when the driving force in the third direction (the Y-axis direction) is generated, the lens holder 320 and the lens barrel 210 are moved in the third direction (the Y-axis direction).

In this case, the second ball members B3 and the third ball member B4 are moved in the rolling motion in the third direction (the Y-axis direction), and the movement of the first ball members B2 is restricted.

A plurality of yokes 510c and 520c are provided to maintain the shake correction actuator 500 and the first to third ball members B2, B3, and B4 in contact with each other.

The plurality of yokes 510c and 520c are fixed to the carrier 300, and are respectively disposed to face the second magnet 510a and the third magnet 520a in the first direction (the Z-axis direction).

Therefore, an attractive force is generated in the first direction (the Z-axis direction) between the yoke 510c and the second magnet 510a, and an attractive force is generated in the first direction (the Z-axis direction) between the yoke 520c and the third magnet 520a.

Since the shake correction actuator 500 is pressed toward the plurality of yokes 510c and 520c by the attractive forces between the plurality of yokes 510c and 520c and the second and third magnets 510a and 520a, the frame 310 and the lens holder 320 of the shake correction actuator 500 are maintained in a state in which they are in contact with the first to third ball members B2, B3, and B4.

The plurality of yokes 510c and 520c may be made of a material that generates the attractive forces between the plurality of yokes 510c and 520c and the second and third magnets 510*a* and 520*a*. As an example, the plurality of yokes 510*c* and 520*c* may be made of a magnetic material.

The plurality of yokes 510*c* and 520*c* are provided to maintain the frame 310 and the lens holder 320 in the state in which they are in contact with the first to third ball members B2, B3, and B4, and a stopper 330 is provided to prevent the first to third ball members B2, B3, and B4, the frame 310, and the lens holder 320 from being externally separated from the carrier 300 due to an external impact or other disturbance.

The stopper 330 is coupled to the carrier 300 to cover at least a portion of an upper surface of the lens holder 320.

In the examples disclosed in this application, in a shake correcting process, a closed loop control manner of detecting and feeding back a position of the lens barrel 210 is used.

Therefore, a second position sensor 540 is provided to perform a closed loop control. The second position sensor 540 is configured to detect a position of the lens barrel 210 in the second direction (the X-axis direction) and a position of the lens barrel 210 in the third direction (the Y-axis direction).

The second position sensor 540 includes the second coil 510*b* and the third coil 520*b*, and further includes the controller 800 (see FIG. 5) electrically connected to the second coil 510*b* and the third coil 520*b*.

The controller 800 receives an inductance value from the second coil 510*b* to detect the position of the lens barrel 210 in the second direction (the X-axis direction), and receives an inductance value from the third coil 520*b* to detect the position of the lens barrel 210 in the third direction (the Y-axis direction).

The second coil 510*b* and the third coil 520*b* serve as both sensing coils and driving coils.

As an example, the second coil 510*b* generates the driving force in the second direction (the X-axis direction) by interacting with the second magnet 510*a*, and is configured so that an inductance value thereof changes depending on movement of the second magnet 510*a*. Alternating current (AC) power may be applied together with direct current (DC) power to the second coil 510*b* to generate the driving force. Only the second coil 510*b* has been described for convenience of explanation, but the description of the second coil 510*b* is also applicable to the third coil 520*b*.

Therefore, the second coil 510*b* may be referred to as a second sensing coil, and the third coil 520*b* may be referred to as a third sensing coil (see FIG. 5).

The second coil 510*b* is configured so that the inductance thereof changes as the second magnet 510*a* is moved in the second direction (the X-axis direction).

As an example, the second coil 510*b* is configured to have a size greater than a size of the second magnet 510*a*. In addition, a relative size of the second coil 510*b* with respect to the second magnet 510*a* is greater than a maximum displacement amount of the second magnet 510*a* in the third direction (the Y-axis direction). That is, the second coil 510*b* is large enough that an entirety of the second magnet 510*a* opposes a corresponding portion of the second coil 510*b* when the second magnet 510*a* is positioned at a maximum displacement in the negative Y-axis direction, and when the second magnet 510*a* is positioned at a maximum displacement in the positive Y-axis direction.

Therefore, the inductance of the second coil 510*b* changes as the second magnet 510*a* is moved in the second direction (the X-axis direction).

In addition, the third coil 520*b* is configured so that an inductance thereof changes as the third magnet 520*a* is moved in the third direction (the Y-axis direction).

As an example, the third coil 520*b* is configured to have a size greater than a size of the third magnet 520*a*. In addition, a relative size of the third coil 520*b* with respect to the third magnet 520*a* is greater than a maximum displacement amount of the third magnet 520*a* in the second direction (the X-axis direction). That is, the third coil 520*b* is large enough that an entirety of the third magnet 520*a* opposes a corresponding portion of the third coil 520*b* when the third magnet 520*a* is positioned at a maximum displacement in the negative X-axis direction, and when the third magnet 520*a* is positioned at a maximum displacement in the positive X-axis direction.

Therefore, the inductance of the third coil 520*b* changes as the third magnet 520*a* is moved in the third direction (the Y-axis direction).

Referring to FIG. 6, as the second magnet 510*a* is moved in the second direction (the X-axis direction), the inductance C3 of the second coil 510*b* changes.

Therefore, a position of the second magnet 510*a* may be detected based on the change in the inductance C3 of the second coil 510*b*. Since the second magnet 510*a* is mounted on the lens holder 320, the lens barrel 210 is mounted in the lens holder 320, and the lens holder 320 is moved together with the lens barrel 210 in the second direction (the X-axis direction), the position of the lens barrel 210 in the second direction (the X-axis direction) may be ultimately detected based on the change in the inductance C3 of the second coil 510*b*.

Referring to FIG. 7, as the third magnet 520*a* is moved in the third direction (the Y-axis direction), the inductance C4 of the third coil 520*b* changes.

Therefore, a position of the third magnet 520*a* may be detected based on the change in the inductance C4 of the third coil 520*b*. Since the third magnet 520*a* is mounted on the lens holder 320, the lens barrel 210 is mounted in the lens holder 320, and the lens holder 320 is moved together with the lens barrel 210 in the third direction (the Y-axis direction), the position of the lens barrel 210 in the third direction (the Y-axis direction) may be ultimately detected based on the change in the inductance C4 of the third coil 520*b*.

Figure 8:
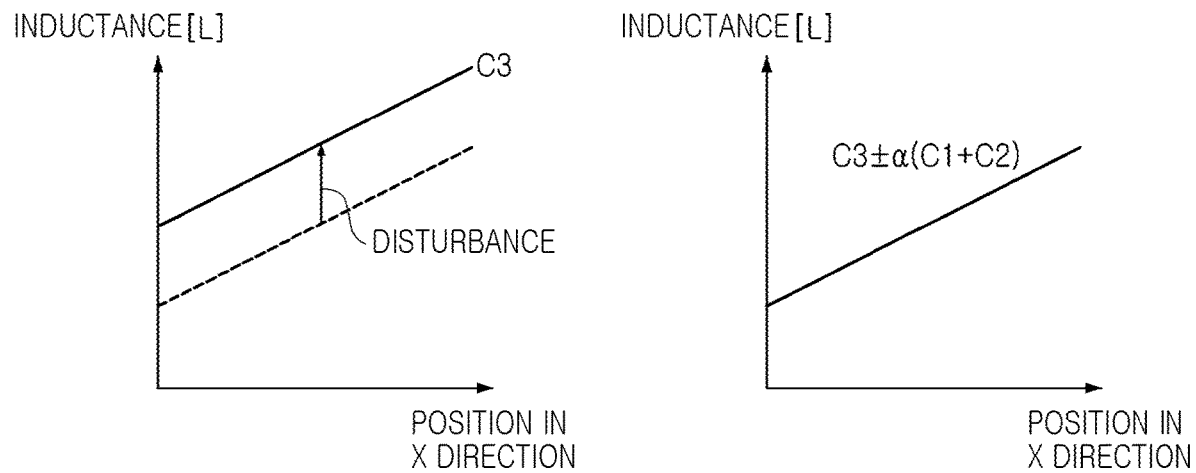
FIG. 8 is a view showing an example of a method of removing an influence of a disturbance when a position in a second direction (an X-axis direction) of a lens barrel is detected.
Figure 9:
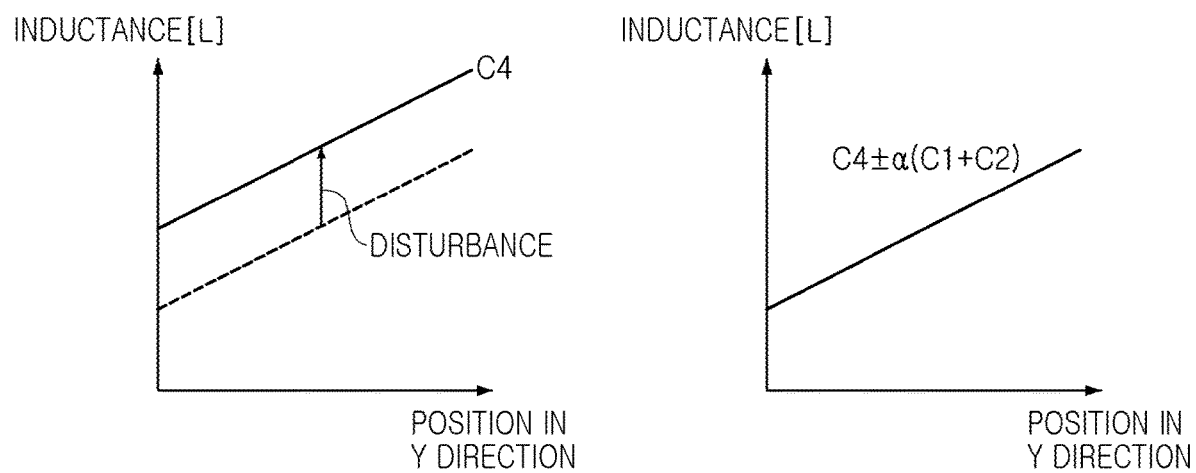
FIG. 9 is a view showing an example of a method of removing an influence of a disturbance when a position in a third direction (a Y-axis direction) of the lens barrel is detected.

FIG. 8 is a view showing an example of a method of removing an influence of a disturbance when a position in a second direction (an X-axis direction) of a lens barrel is detected, and FIG. 9 is a view showing an example of a method of removing an influence of a disturbance when a position in a third direction (a Y-axis direction) of the lens barrel is detected.

Referring to FIGS. 8 and 9, the inductances C3 and C4 of the second and third coils 510*b* and 520*b* also change due to factors other than distances between the second and third coils 510*b* and 520*b* and the second and third magnets 510*a* and 520*a*.

As an example, the inductances C3 and C4 of the second and third coils 510*b* and 520*b* also change due to an influence of a disturbance caused by a temperature change of the surrounding environment. Therefore, an error may occur in the detected position of the lens barrel 210 due to the disturbance.

Although FIGS. 8 and 9 illustrate cases in which the inductances C3 and C4 increase due to the disturbance, the inductances C3 and C4 may also decrease due to the disturbance.

Therefore, the camera module in the examples described in this application is configured to compensate values of the inductances C3 and C4 of the second and third coils 510*b* and 520*b* to remove the influence of the disturbance.

Referring to FIG. 3C, when the value of the inductance C1 of the 1-1-th sensing coil 470a and the value of the inductance C2 of the 1-2-th sensing coil 470b are added together to obtain a sum value (C1+C2), the sum value (C1+C2) of the inductances has a constant value regardless of the position of the lens barrel 210.

In addition, the sum value (C1+C2) of the inductances changes depending on a level of the disturbance. As an example, when the influence of the disturbance is large, the sum value (C1+C2) of the inductances is relatively large, and when the influence of the disturbance is small, the sum value (C1+C2) of the inductances is relatively small.

That is, the sum value (C1+C2) of the inductances changes due to the disturbance, but does not change due to the position of the lens barrel 210.

Therefore, in the examples described in this application, the influence of the disturbance at the time of correcting shake may be removed using the sum value (C1+C2) of the inductances.

For example, referring to FIG. 8, the influence of the disturbance is removed by adding or subtracting a value based on a sum value (C1+C2) obtained by adding together the value of the inductance C1 of the 1-1-th sensing coil 470a and the value of the inductance C2 of the 1-2-th sensing coil 470b to or from the value of the inductance C3 of the second coil 510.

In this case, to accurately compensate for the disturbance, the sum value (C1+C2) obtained by adding together the values of the inductances C1 and C2 of the 1-1-th sensing coil 470a and the 1-2-th sensing coil 470b is multiplied by a predetermined constant $\alpha$.

The predetermined constant $\alpha$ may be a gain constant, and may be stored in a memory of the camera module in consideration of a manufacturing error during a process of manufacturing the camera module and the influence of the disturbance.

A value ($\alpha$*(C1+C2)) obtained by multiplying the sum value (C1+C2) obtained by adding together the value of the inductance C1 of the 1-1-th sensing coil 470a and the value of the inductance C2 of the 1-2-th sensing coil 470 by the predetermined constant $\alpha$ will hereinafter be referred to as a reference inductance.

The second position sensor 540 is configured to detect an accurate position of the lens barrel 210 in the second direction (the X-axis direction) by adding or subtracting the reference inductance to or from the value of the inductance C3 of the second coil 510b.

Referring to FIG. 9, the influence of the disturbance is removed by adding or subtracting the reference inductance to or from the value of the inductance C4 of the third coil 520b.

The second position sensor 540 is configured to detect an accurate position of the lens barrel 210 in the third direction (the Y-axis direction) by adding or subtracting the reference inductance to or from the value of the inductance C4 of the third coil 520b.

Figure 10:
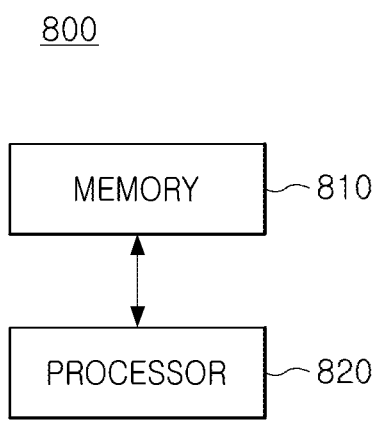
FIG. 10 is a block diagram illustrating an example of the controller of FIG. 5.

FIG. 10 is a block diagram illustrating an example of the controller of FIG. 5.

Referring to FIG. 10, a controller 800 includes a memory 810 and a processor 820. The memory 810 stores instructions that, when executed by the processor 820, cause the processor 820 to perform the functions of the controller 800 described in this application.

The examples of the camera module described above enable the camera module to be miniaturized, a sufficient driving force to be obtained, and the position of the lens barrel to be precisely measured.

The controller 800 in FIG. 5 that performs the operations described in this application is implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, transistors, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods described with reference to FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
    a first position sensor configured to detect a position of a lens barrel in a first direction and comprising a 1-1-th sensing coil and a 1-2-th sensing coil having respective inductances that change as the lens barrel moves in the first direction; and
    a second position sensor comprising a second sensing coil having an inductance that changes as the lens barrel moves in a second direction, and a third sensing coil having an inductance that changes as the lens barrel moves in a third direction,
    wherein the second position sensor is configured to detect a position of the lens barrel in the second direction and a position of the lens barrel in the third direction by adding or subtracting a reference inductance to or from the inductance of the second sensing coil and the inductance of the third sensing coil, and
    the reference inductance is obtained by multiplying a sum value obtained by adding together the inductance of the 1-1-th sensing coil and the inductance of the 1-2-th sensing coil by a predetermined constant.

2. The camera module of claim 1, wherein the 1-1-th sensing coil and the 1-2-th sensing coil are configured so that increase and decrease directions of the inductance of the 1-1-th sensing coil as the lens barrel moves in the first direction are different from increase and decrease directions of the inductance of the 1-2-th sensing coil as the lens barrel moves in the first direction.

3. The camera module of claim 2, wherein the 1-1-th sensing coil and the 1-2-th sensing coil are arranged in the first direction, and
    the first direction is an optical-axis direction of an optical axis of the lens barrel.

4. The camera module of claim 1, wherein the first position sensor is further configured to detect the position of the lens barrel in the first direction by subtracting the inductance of the 1-2-th sensing coil from the inductance of the 1-1-th sensing coil.

5. The camera module of claim 1, wherein the first position sensor further comprises a sensing yoke configured to move in the first direction together with the lens barrel, and
    the sensing yoke is disposed to face the 1-1-th sensing coil and the 1-2-th sensing coil in a direction perpendicular to the first direction.

6. The camera module of claim 5, wherein the sensing yoke is a conductor or a magnetic body.

7. The camera module of claim 1, further comprising a focusing actuator configured to move the lens barrel in the first direction and comprising:
    a first magnet configured to move in the first direction together with the lens barrel; and
    a first coil disposed to face the first magnet.

8. The camera module of claim 1, further comprising a shake correction actuator comprising:
    a second magnet disposed to face the second sensing coil in the second direction and configured to move in the second direction together with the lens barrel; and
    a third magnet disposed to face the third sensing coil in the third direction and configured to move in the third direction together with the lens barrel.

9. The camera module of claim 8, wherein the second sensing coil is configured to generate a driving force in the second direction by interacting with the second magnet, and so that the inductance of the second sensing coil changes depending on movement of the second magnet.

10. The camera module of claim 8, wherein the second sensing coil is further configured to generate the driving force in the second direction in response to direct current (DC) power and alternating current (AC) power being applied together to the second sensing coil.

11. The camera module of claim 8, wherein the third sensing coil is configured to generate a driving force in the third direction by interacting with the third magnet, and so that the inductance of the third coil changes depending on movement of the third magnet.

12. The camera module of claim 8, wherein the third sensing coil is further configured to generate the driving force in the third direction in response to direct current (DC) power and alternating current (AC) power being applied together to the third sensing coil.

13. The camera module of claim 1, wherein the first direction is an optical-axis direction of an optical axis of the lens barrel, the second direction is a direction perpendicular to the first direction, and the third direction is a direction perpendicular to both the first direction and the second direction.

14. A camera module comprising:
a lens barrel;
a housing accommodating the lens barrel therein;
a focusing actuator configured to move the lens barrel in a first direction and comprising:
a first magnet configured to move in the first direction together with the lens barrel; and
a first coil disposed to face the first magnet;
a shake correction actuator configured to move the lens barrel in a second direction perpendicular to the first direction and a third direction perpendicular to both the first direction and the second direction, the shake correction actuator comprising:
a second magnet configured to move in the second direction together with the lens barrel;
a third magnet configured to move in the third direction together with the lens barrel;
a second coil disposed to face the second magnet; and
a third coil disposed to face the third magnet;
a first position sensor configured to detect a position of the lens barrel in the first direction; and
a second position sensor configured to detect a position of the lens barrel in the second direction and a position of the lens barrel in the third direction,
wherein the first position sensor comprises:
a 1-1-th sensing coil configured so that an inductance thereof changes as the lens barrel moves in the first direction; and
a 1-2-th sensing coil configured so that an inductance thereof changes as the lens barrel moves in the first direction,
the second position sensor is further configured to detect the position of the lens barrel in the second direction by adding or subtracting a reference inductance to or from an inductance of the second coil, and detect the position of the lens barrel in the third direction by adding or subtracting the reference inductance to or from an inductance of the third coil, and
the reference inductance is obtained by multiplying a sum value obtained by adding together the inductance of the 1-1-th sensing coil and the inductance of the 1-2-th sensing coil by a predetermined constant.

15. The camera module of claim 14, wherein the 1-1-th sensing coil and the 1-2-th sensing coil are arranged in the first direction,
the first direction is an optical-axis direction of an optical axis of the lens barrel, and
the 1-1-th sensing coil and the 1-2-th sensing coil are configured so that increase and decrease directions of the inductance of the 1-1-th sensing coil as the lens barrel moves in the first direction are different from increase and decrease directions of the inductance of the 1-2-th sensing coil as the lens barrel moves in the first direction.

16. A camera module comprising:
a 1-1-th sensing coil having an inductance that changes as a lens barrel moves in a first direction;
a 1-2-th sensing coil having an inductance that changes as the lens barrel moves in the first direction;
a second sensing coil having an inductance that changes as the lens barrel moves in a second direction;
a third sensing coil having an inductance that changes as the lens barrel moves in a third direction; and
a processor configured to:
detect a position of the lens barrel in the first direction based on the inductance of the 1-1-th sensing coil and the inductance of the 1-2-th sensing coil,
detect a position of the lens barrel in the second direction based on the inductance of the second sensing coil, the inductance of the 1-1-th sensing coil, and the inductance of the 1-2-th sensing coil, and
detect a position of the lens barrel in the third direction based on the inductance of the third sensing coil, the inductance of the 1-1-th sensing coil, and the inductance of the 1-2-th sensing coil.

17. The camera module of claim 16, further comprising a memory configured to store instructions executable by the processor,
wherein the processor is further configured to execute the instructions to configure the processor to:
detect the position of the lens barrel in the first direction based on the inductance of the 1-1-th sensing coil and the inductance of the 1-2-th sensing coil,
detect the position of the lens barrel in the second direction based on the inductance of the second sensing coil, the inductance of the 1-1-th sensing coil, and the inductance of the 1-2-th sensing coil, and
detect the position of the lens barrel in the third direction based on the inductance of the third sensing coil, the inductance of the 1-1-th sensing coil, and the inductance of the 1-2-th sensing coil.

18. The camera module of claim 16, wherein the processor is further configured to:
obtain a difference value by subtracting the inductance of the 1-2-th sensing coil from the inductance of the 1-1-th sensing coil,
obtain a sum value by adding together the inductance of the 1-1-th sensing coil and the inductance of the 1-2-th sensing coil,
detect the position of the lens barrel in the first direction based on the difference value,
detect the position of the lens barrel in the second direction based on the inductance of the second sensing coil and the sum value, and detect the position of the lens barrel in the third direction based on the inductance of the third sensing coil and the sum value.

19. The camera module of claim 16, wherein the 1-1-th sensing coil and the 1-2-th sensing coil are configured so that a direction in which the inductance of the 1-1-th sensing coil changes as the lens barrel moves in the first direction is opposite to a direction in which the inductance of the 1-2-th sensing coil changes as the lens barrel moves in the first direction.

20. A camera module comprising:
a first sensing coil comprising a 1-1-th sensing coil and a 1-2-th sensing coil configured so that a first value based on an inductance of the 1-1-th sensing coil and an inductance of the 1-2-th sensing coil changes as a lens barrel moves in a first direction, and a second value based on the inductance of the 1-1-th sensing coil and the inductance of the 1-2-th sensing coil remains constant as the lens barrel moves in the first direction;
a second sensing coil having an inductance that changes as the lens barrel moves in a second direction;
a third sensing coil having an inductance that changes as the lens barrel moves in a third direction; and
a processor configured to:
detect a position of the lens barrel in the first direction based on the first value;
detect a position of the lens barrel in the second direction based on the inductance of the second sensing coil and the second value, and
detect a position of the lens barrel in the third direction based on the inductance of the third sensing coil and the second value.

21. The camera module of claim 20, further comprising a memory configured to store instructions executable by the processor,
wherein the processor is further configured to execute the instructions to configure the processor to:
detect the position of the lens barrel in the first direction based on the first value;
detect the position of the lens barrel in the second direction based on the inductance of the second sensing coil and the second value, and
detect the position of the lens barrel in the third direction based on the inductance of the third sensing coil and the second value.

22. The camera module of claim 20, wherein the processor is further configured to:
obtain the first value by subtracting the inductance of the 1-2-th sensing coil from the inductance of the 1-1-th sensing coil,
obtain the second value by adding together the inductance of the 1-1-th sensing coil and the inductance of the 1-2-th sensing coil,
obtain a reference inductance by multiplying the second value by a predetermined constant,
obtain a first compensated inductance by adding or subtracting the reference inductance to or from the inductance of the second sensing coil,
obtain a second compensated inductance by adding or subtracting the reference to or from the inductance of the third sensing coil,
detect the position of the lens barrel in the second direction based on the first compensated inductance, and
detect the position of the lens barrel in the third direction based on the second compensated inductance.

23. The camera module of claim 22, wherein the 1-1-th sensing coil and the 1-2-th sensing coil are further configured so that the inductance of the 1-1-th sensing coil and the inductance of the 1-2-th sensing coil change in opposite directions as the lens barrel moves in the first direction, and change in a same direction as a temperature of the camera module changes.

* * * * *